United States Patent
Thompson et al.

(12)

(10) Patent No.: US 6,305,628 B1
(45) Date of Patent: Oct. 23, 2001

(54) CONTROLLED TAPE STOPPING WITH FEED FORWARD DURING POWER LOSS

(75) Inventors: Mark R. Thompson, Fountain Valley; Kempton W. Redhead, Huntington Beach, both of CA (US)

(73) Assignee: Seagate Removable Storage Solutions LLC, Scotts Valley, CA (US)

( * ) Notice: Subject to any disclaimer, the term of this patent is extended or adjusted under 35 U.S.C. 154(b) by 0 days.

(21) Appl. No.: 09/440,552

(22) Filed: Nov. 15, 1999

Related U.S. Application Data
(60) Provisional application No. 60/109,110, filed on Nov. 18, 1998.

(51) Int. Cl.[7] .................................................. G11B 15/46
(52) U.S. Cl. .................................. 242/334.3; 242/334.5; 360/74.1
(58) Field of Search ........................... 242/334.2, 334.3, 242/334.4, 334.5; 360/74.1

(56) References Cited

U.S. PATENT DOCUMENTS 3,873,896 * 3/1975 Jennings .............................. 242/334.3

\* cited by examiner

Primary Examiner—John Q. Nguyen
(74) Attorney, Agent, or Firm—McDermott, Will & Emery

(57) ABSTRACT

A reel-to-reel tape system stops movement of the tape during a power loss situation without overrun by one of the tape reels and without causing undue stress upon the tape itself. If rotational momentum of the supply reel is sensed to be disproportionately larger than the momentum of the take-up reel, supply motor back emf for dynamically braking the supply reel is applied while also driving the take-up reel in the direction of rotation in which it operated when the power source was discontinued. An appropriate amount of tension is maintained on the tape until the tape motion has come to a complete stop. A capacitor large enough to supply the power needed to provide current to the power bridge of the motor drivers is provided. The capacitor is charged upon power up of the drive and is not tapped unless and until the normal supply voltage of the motor drivers is turned off. The take-up reel motor is provided with optimum current to take up the loose tape that otherwise would be produced in the tape path and around the reels, thus preventing a hazardous situation.

12 Claims, 5 Drawing Sheets

CONTROLLED TAPE STOPPING WITH FEED FORWARD DURING POWER LOSS

RELATED APPLICATION

This application claims priority from Provisional Application No. 60/109,110 filed Nov. 18, 1998 incorporated herein by reference.

TECHNICAL FIELD

The present invention relates generally to reel-to-reel tape drive systems and more particularly to control of such a system during a period in which application of normal power has been interrupted.

BACKGROUND

The use of tape drive systems as nonvolatile data storage for archival purposes, as well as for retrieval for data processing, has become increasingly commonplace. A tape drive system typically interacts with, and interfaces to, a computer or PC or the like through an application specific integrated circuit (ASIC) incorporated within or associated with the computer. FIG. 1 is a simplified illustration of a tape path mapping between take-up and supply reels. The tape 18 passes through an assembly 16 of read and write heads structurally arranged to appropriately configure the tape path between supply reel 32 and take-up reel 34. As indicated by the arrows, the tape can be driven bidirectionally so that each reel can perform both supply and take-up functions.

As can be appreciated, the requirements for accuracy in reading and writing of data on tape are much more critical than in analog applications in which tape recording and playback provide audio or video presentations. While a tape error in the latter systems may result in a momentary glitch in audio or video that may not even be noticed, the density of data bit storage and necessity for negligible bit rate error imposes potential disastrous effects on the data processing capability if a tape error should occur. Accuracy and consistency of the drive rate at which the tape traverses the read and write heads are of ultimate importance. Tape drive systems for data storage and retrieval thus have become highly sophisticated in controlling the motor drive characteristics of the drive motors for each reel motor, in maintaining appropriate tension in the tape path, and in controlling threading of the tape throughout the path to avoid diversion of the tape from its path position or breakage of the tape. These measures ensure accuracy in accessing the appropriate point in the tape during start-up, running and stopping conditions. During normal operations, precision stopping of the tape is accomplished by increasing back tension on the supply reel while reducing forward tension on the take up reel.

Stopping tape movement in a reel to reel application provides unique difficulties during a power loss situation. The implementation of braking by using motor back emf alone, during such a situation, does not necessarily prevent the loss of tape path integrity. Braking by using back emf on the supply reel is ineffective if the momentum of the supply reel is significantly greater than that of the take-up reel. Such an inequality would occur if the radius of the tape accumulated on the supply reel at the time of power interruption is greater than the radius of the tape accumulated on the take-up reel. The torque provided by braking using motor back emf on the supply reel would not then be sufficient to balance the rates of deceleration of both reels. As the take-up reel will be stopped sooner than the supply reel, the appropriate tension along the tape path can not be maintained. After the take-up reel is stopped, the continued rotation of the supply reel causes a tape run out, loosening tension in the tape path and subjecting the tape to destruction.

The need exists to maintain tape path integrity, in the event of power failure, with minimal or no tape becoming loosened, either around the reel which supplies the tape, the reel which takes up the tape, or the tape path from reel to reel, other than an amount which might occur during normal operations.

DISCLOSURE OF THE INVENTION

The present invention fulfills the above-described needs by stopping the movement of tape in a reel-to-reel tape system during a power loss situation without overrun by one of the tape reels and without causing undue stress upon the tape itself. These and other advantages of the invention are satisfied, at least in part, through the use of motor back emf for dynamically braking the supply reel while also driving the take-up reel in the direction of rotation in which it operated when the power source was discontinued. An appropriate amount of tension is maintained on the tape until the tape motion has come to a complete stop. The degree to which the take-up reel is driven during this time is dependent on the relative momentum, and tape radius, between the two reels as determined by appropriate sensing means. The necessary systems involved in tape movement are kept alive until the tape is stopped.

In one preferred embodiment, a capacitor large enough to supply the power needed to provide current to the power bridge of the motor drivers and other necessary circuitry is provided. The capacitor is charged upon power up of the drive and is not tapped unless and until the normal supply voltage of the motor drivers is turned off. At that point the system driving the motors will be powered by the capacitor. The supply reel motor is braked by the use of back emf voltage and the take-up reel motor is driven forward. The take-up reel motor is provided with optimum current to take up the loose tape that otherwise would have been produced in the tape path and around the reels, thus preventing a hazardous situation. The radii of the two reels, the direction of travel, and the speed at which the tape is moving contribute to determining which reel will be placed in either a dynamically braked, coast, or feed forward mode. In an alternative embodiment, a battery backup is provided to supply the take-up reel driving current upon loss of the primary power supply.

Additional advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

DETAILED DESCRIPTION OF THE INVENTION

Figure 1:
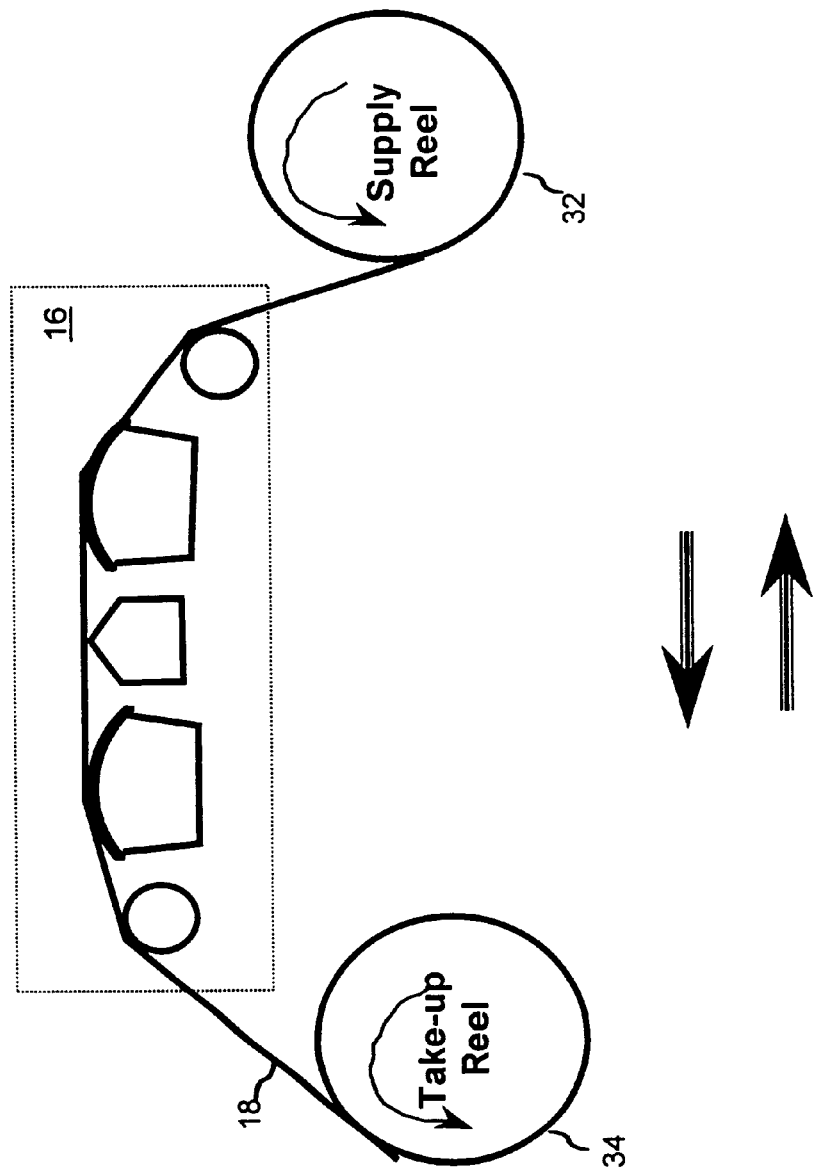
FIG. 1 is a simplified illustration of a tape path mapping between take-up and supply reels in a reel to reel type drive system.
Figure 2:
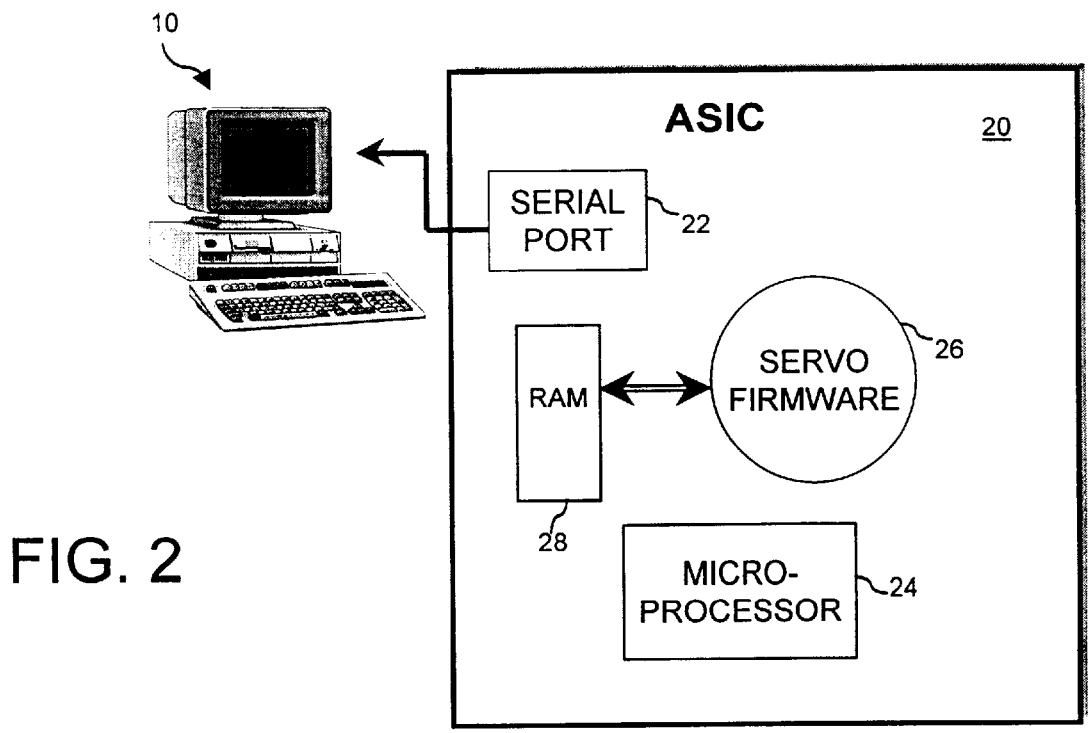
FIG. 2 is a high level partial block diagram of tape drive system elements relative to the present invention.
Figure 2:
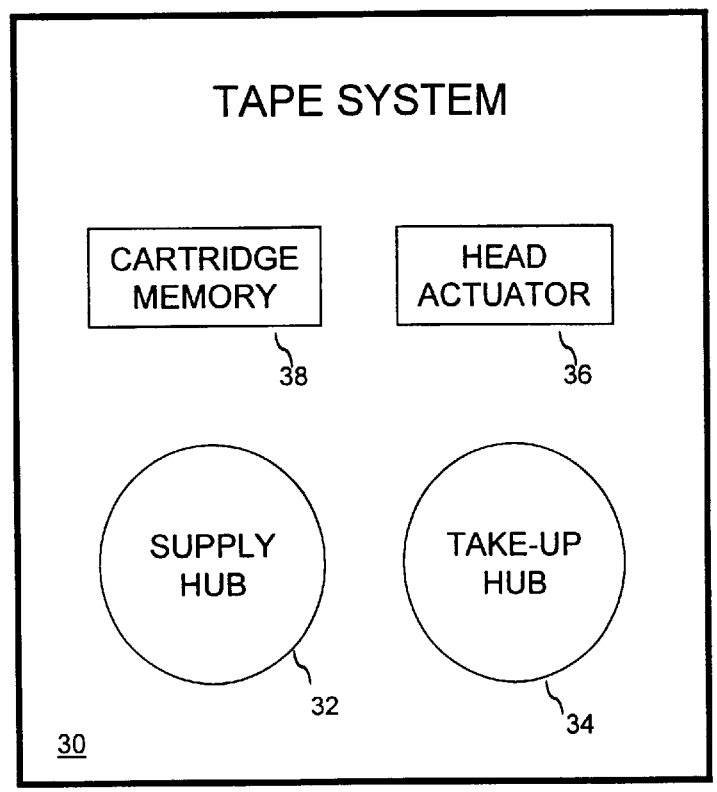
Figure 3:
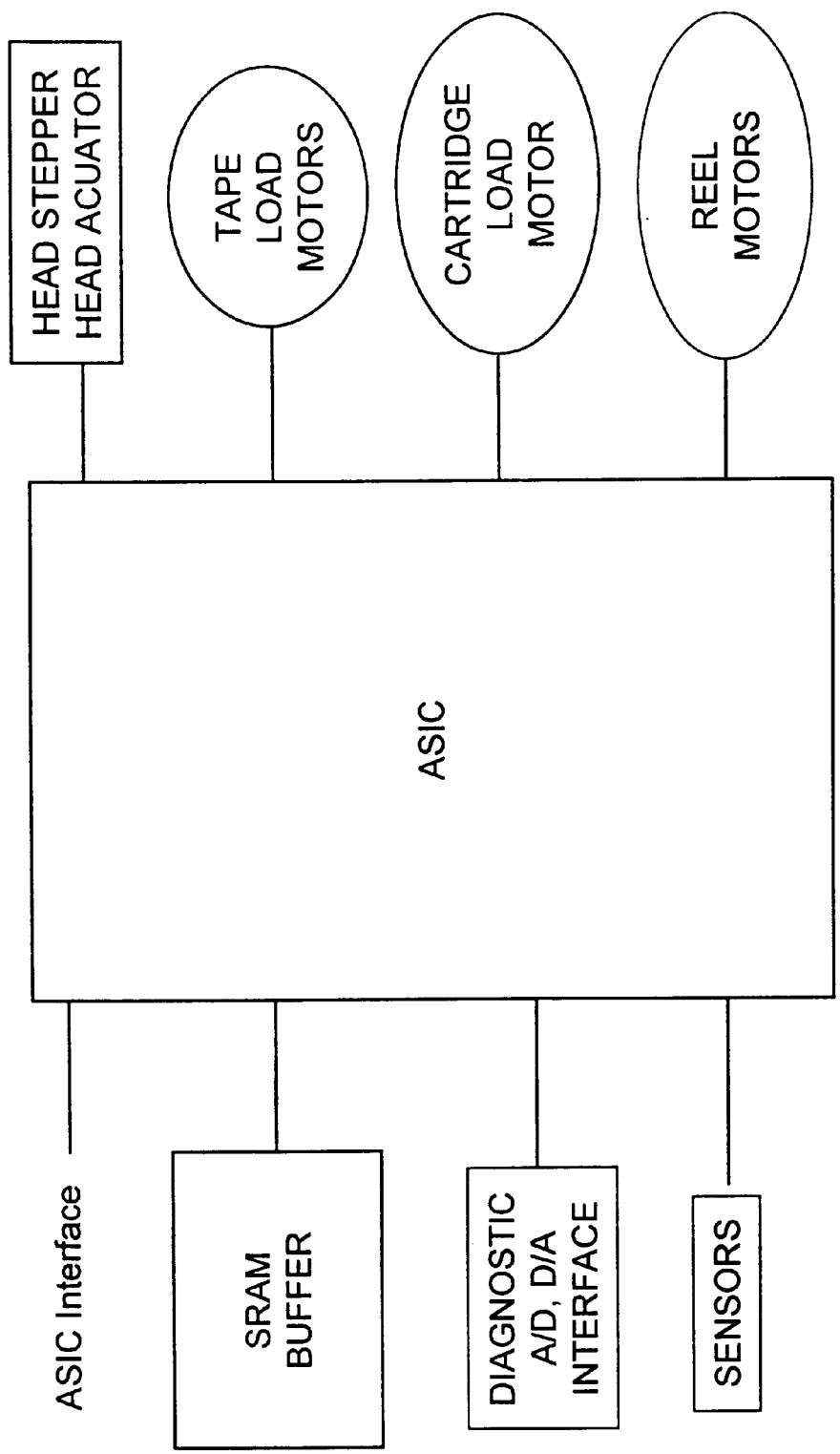
FIG. 3 is a functional block diagram illustrative of various ASIC controls that are operational in the reel-to-reel tape drive system of the present invention.

FIG. 2 is a high level partial block diagram of elements that pertain to the present invention. It should be understood that additional system architecture directed to certain aspects of operation that are not required for an understanding of the present invention, such as tape formatting and read/write functions, has not been depicted for ease of illustration. The tape drive system is illustrated in the context of a supporting peripheral for PC 10, which communicates with ASIC 20 through serial port 22. ASIC microprocessor 24, under control of servo firmware 26 and through use of the RAM 28 resource, provides the supervision for the various functions of the tape system shown in the block diagram of FIG. 3. The ASIC may comprise, for example a commercially available 32-bit RISC processor (such as ARM7TDNI). Tape drive 30 implements a reel-to-reel tape configuration of tape supply hub 32 and tape take-up hub 34. Head actuator 36 implements storage and retrieval of data to/from the tape, the location of tape data coordinated with cartridge memory 38. As illustrated in FIG. 3, the ASIC supervises control of the head stepper and head actuator, tape load motors cartridge load motor, reel motors, various system sensors, diagnostic A/D, D/A interface and buffer. Only those functions and elements necessary for understanding the present invention will be discussed in further detail.

Figure 4:
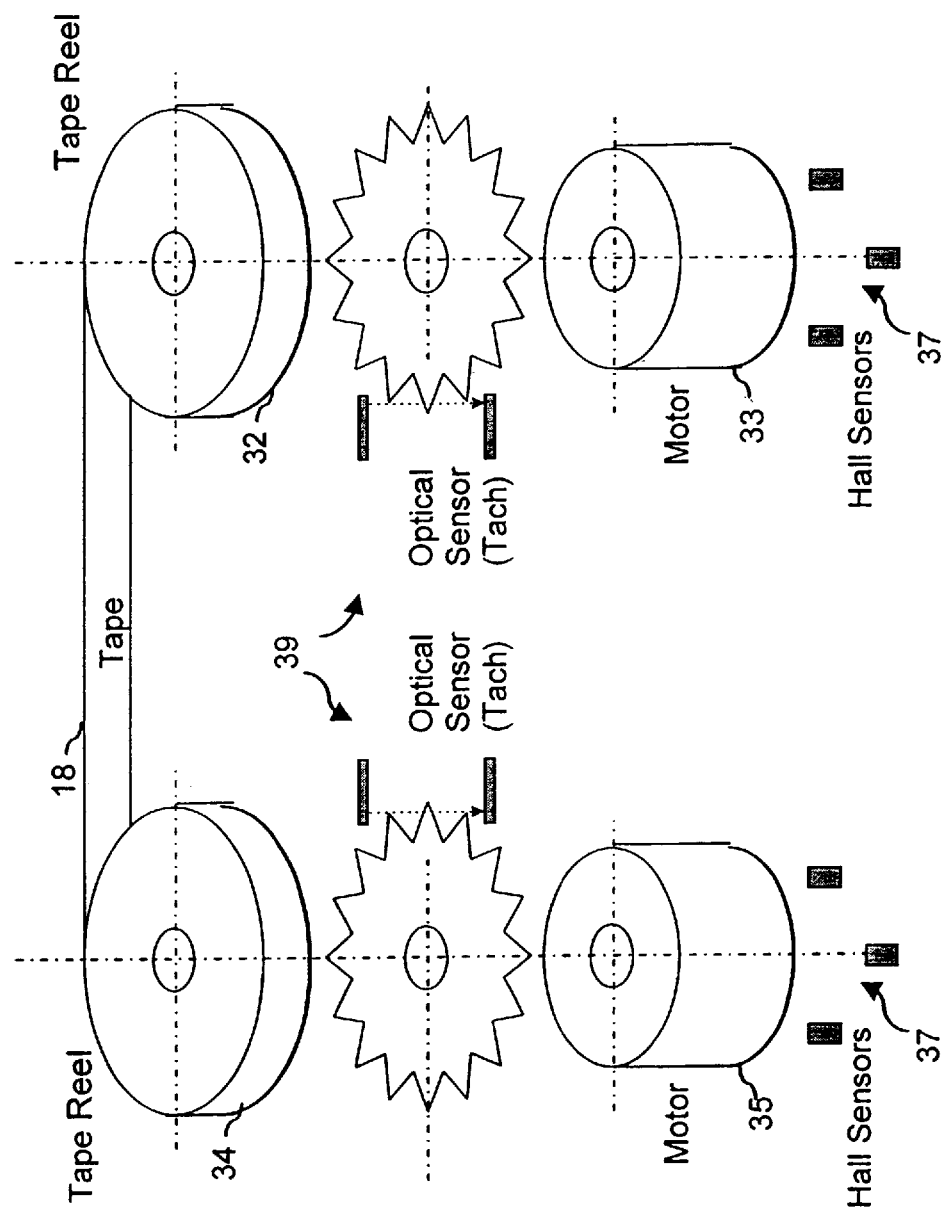
FIG. 4 is a diagrammatic representation of the reel motor coupling and feedback sensing mechanism of the present invention.

FIG. 4 is a diagrammatic representation of the reel motor coupling and feedback sensing mechanism of the present invention. Tape reels 32 and 34 are coupled respectively to drive motors 33 and 35, which are each individually controlled. The reel motors may be, for example, well known ten pole, three phase brushless motors operational with sinusoidal back emf. Hall probe sensors 37 provide positional information in known manner for motor startup control. Tachometers 39, which may comprise well known optical sensor arrangements, are provided to obtain precise shaft speed and position information during shaft rotation conditions.

Figure 5:
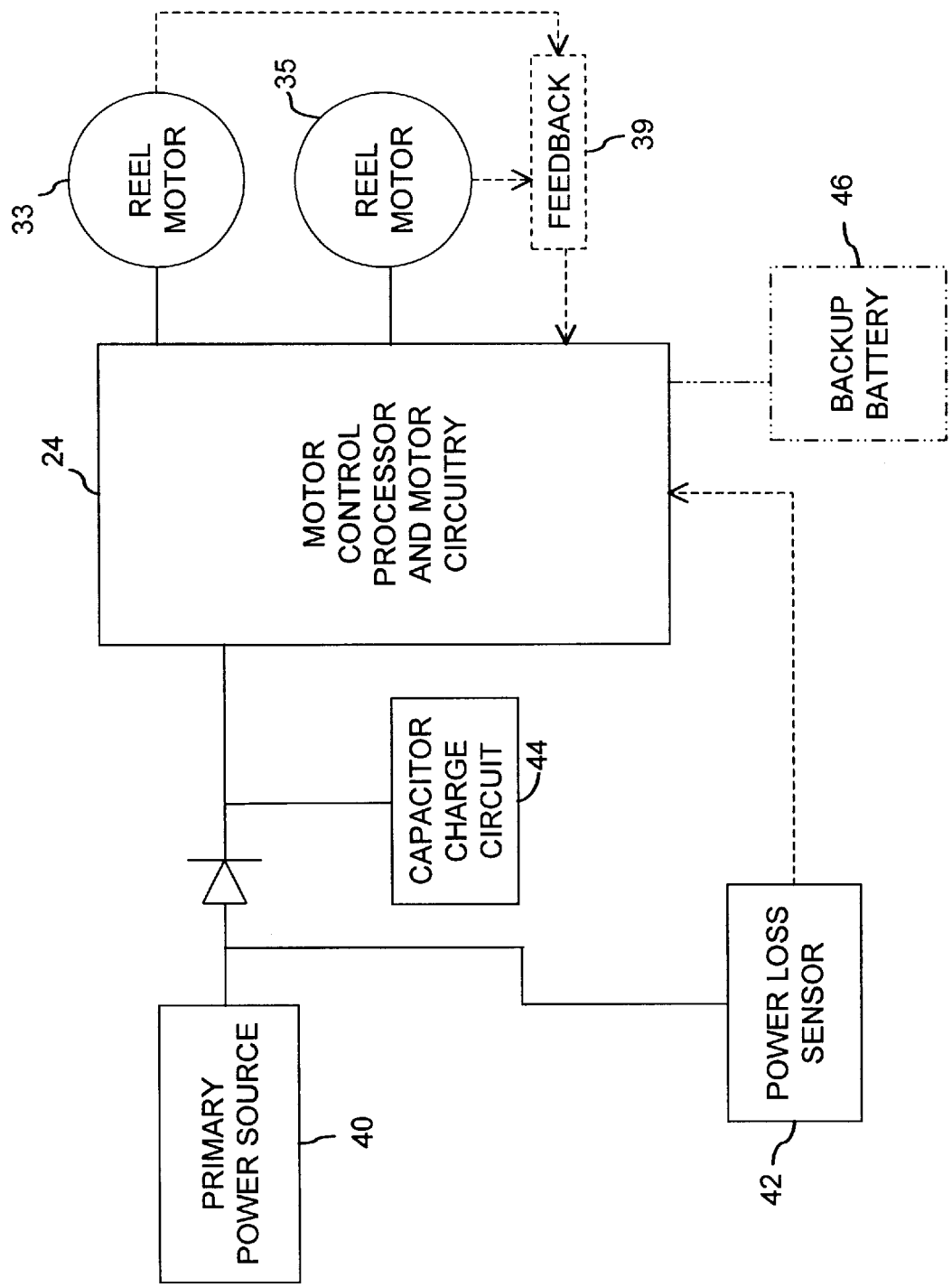
FIG. 5 is a block diagram illustrative of controlled tape stopping with feed forward of a take-up reel during power loss, in accordance with the present invention.

FIG. 5 is a block diagram illustrative of controlled tape stopping with feed forward of the take-up reel during power loss, in accordance with the present invention. Supply reel motor 33 and take-up reel motor 35 are connected to ASIC 50 motor controller and necessary motor circuitry 24. Primary power source 40 is connected to the motor control processor 24 and to a capacitor charge circuit 44, the latter being also connected to the control processor and necessary motor circuitry. Power loss sensor 42 is connected to the power source. These connections are represented by solid lines, indicative of actual circuit connections. Feedback 39, which includes the above described tachometer and Hall sensors outputs as well as other system sensing elements, feeds appropriate signals to the motor control processor, which also receives signals from the power loss sensor. Feedback 39 is indicative of relative motor rotation as well as other sensed system parameters, such as tape tension, etc. The signaling interconnections are shown in the drawing as dotted line connections, indicative of control function operations. As an alternative, or addition, to the capacitor circuit is backup battery 46.

In normal operations, power is available from the primary power source to power the reel motors as well as to supply the ASIC and other tape system elements. Operations are controlled as described above. During connection of the primary power source, capacitor charge circuit 44 is active to provide capacitive charge sufficient to serve as a temporary backup source of power. When loss of the primary power source is sensed by power loss sensor 42, the sensor outputs a signal indicative of this condition to the processor. The condition is then recognized by the processor, which then latches necessary outputs controlling the stopping of the reel motors and maintaining the appropriate tension in the tape path. Power supply for this purpose is available from the charged capacitor or, alternatively, from the backup battery. The supply current is limited to the take up reel such that the system will not be able to run away should the power fail condition be invoked, yet the take up reel will have the minimum feed forward current necessary to safely ramp down the reels, thus maintaining tape path integrity. During this period, the processor is stopped with its outputs latched into the necessary power fail states. The take up reel is driven forward until the capacitor/battery/alternative supply is depleted or until the processor resets and turns off the motor. The amount of current/torque applied to the reel motor circuitry is limited by a current limit in the motor driver circuitry. Under normal operations this current limit is set high enough so as not to interfere with the operation of the drive. During power failure the current limit is changed, via a switch, to a low amount. This value is set low enough such that the reel motor will not be able to move the tape from a stop and high enough that the tape will not become loose during a power fail ramp down condition.

In this disclosure there is shown and described only the preferred embodiment of the invention and but a few examples of its versatility. It is to be understood that the invention is capable of use in various other combinations and environments and is capable of changes or modifications within the scope of the inventive concept as expressed herein.

What is claimed is:

1. A reel to reel tape drive system for storing and accessing digital data, said system comprising:
   first and second drive motors coupled to respective supply and take-up reels; and
   current supplying means for supplying current to one of said drive motors upon loss of power to both of said motors;
   wherein said current supplying means applies current to the take-up reel motor to compensate for continued rotation of said supply reel.

2. A system as recited in claim 1, wherein said current supplying means interrupts application of current to said take-up reel motor as rotation of said supply reel ceases thereby to maintain tape path integrity.

3. A system as recited in claim 1, wherein said current supplying means comprises a battery.

4. A system as recited in claim 1, wherein said current supplying means comprises a capacitor.

5. In a tape data storage system having a motor driven tape supply reel and a motor driven tape take-up reel and a tape path therebetween for retrieving data from or storing data to the tape, a method for maintaining integrity of the tape path comprising the steps of:
   driving the supply reel motor and the take-up reel motor in a forward direction from a power supply during normal data storage and retrieval operations;

in response to failure of said power supply, applying dynamic braking to said supply reel motor and the take-up reel motor;

sensing the relative momentum of said supply reel and take-up reel during said applying step; and applying an alternative supply of driving current to said take-up reel in response to detection of a significantly greater momentum of said supply reel in said sensing step;

wherein destructive loosening of said tape path during the power supply failure condition is avoided.

6. A method as recited in claim 5, wherein said alternative supply of driving current comprises a backup battery.

7. A method as recited in claim 5, wherein the alternative current supply is applied to drive the take-up reel in the forward direction;

wherein undo tension stress of the tape is avoided.

8. A method as recited in claim 5, wherein said alternative supply of driving current comprises a capacitor.

9. A reel to reel tape drive system for storing and accessing digital data, said system comprising:

first and second drive motors coupled to respective supply and take-up reels;

a motor control processor, connected to a power supply source and to each of said first and second drive motors;

a backup power supply;

a plurality of reel condition sensors; and a power loss sensor; wherein current from the backup power supply is supplied to drive the take-up reel motor while braking current is supplied to the supply reel motor upon loss of said power supply source and in response to a sensed imbalance condition by said reel condition sensors.

10. A system as recited in claim 9, said reel condition sensors comprise tachometers coupled to the reel motors and said sensed imbalance condition is indicative of a greater rotational momentum of said supply reel than said take-up reel when said power supply source is lost.

11. A system as recited in claim 10, wherein said backup power supply comprises a battery.

12. A system as recited in claim 10, wherein said backup power supply comprises charge accumulated by a capacitor charge circuit from said power supply source prior to the loss of said power supply source.

* * * * *